March 17, 1931.  W. S. MAYER ET AL  1,797,214
CONDUIT CLAMP
Filed Dec. 18, 1928
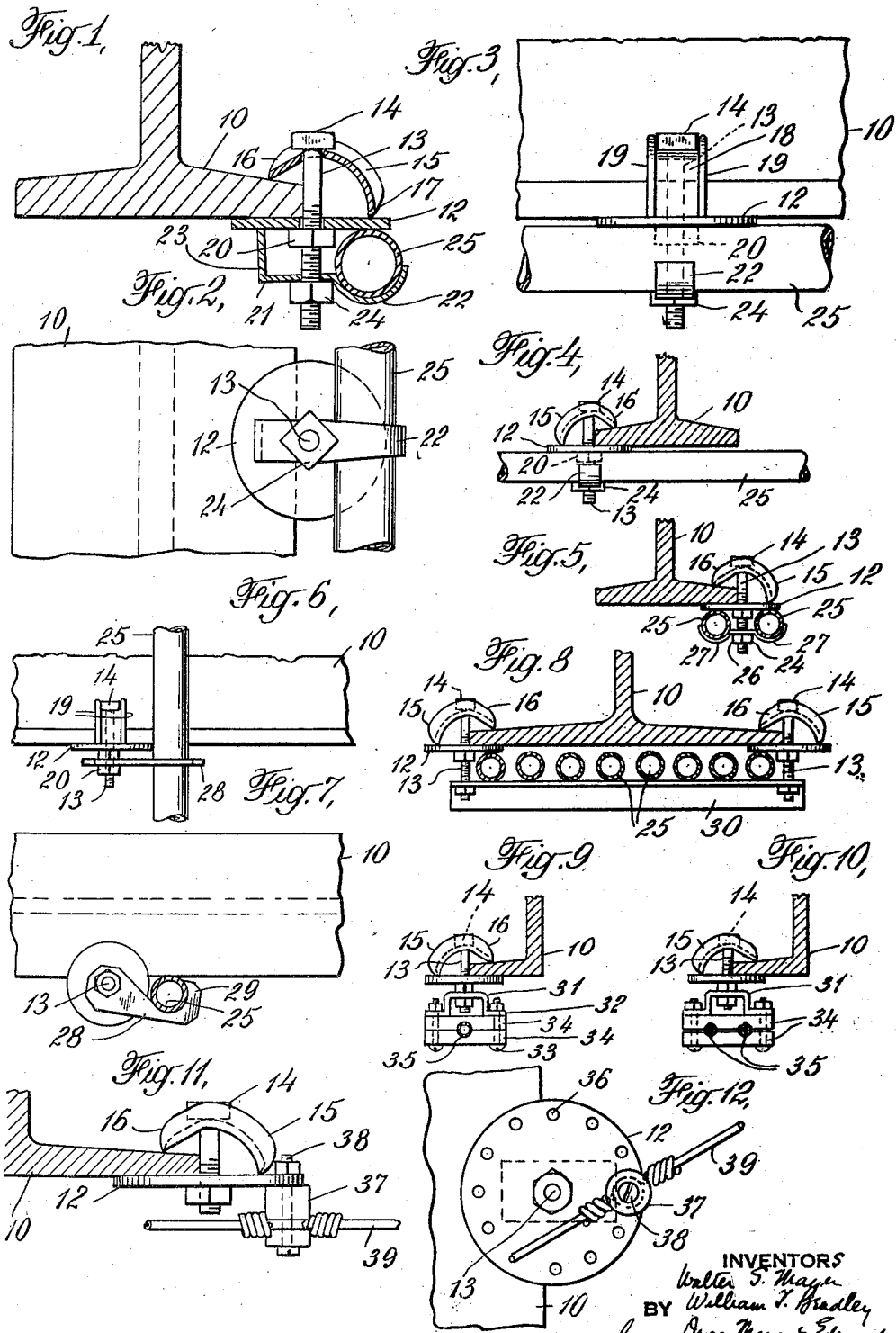

Patented Mar. 17, 1931

1,797,214

UNITED STATES PATENT OFFICE

WALTER S. MAYER AND WILLIAM T. BRADLEY, OF PHILADELPHIA, PENNSYLVANIA

CONDUIT CLAMP

Application filed December 18, 1928. Serial No. 326,783.

This invention relates to supporting devices which may be attached to various objects or structural elements for the purpose of securing and supporting conduits, cables, insulators and the like. More specifically the invention is concerned with a device of this type which is readily attachable to a structural element such as the flange of an I-beam, and provides means for receiving and clamping a conduit, etc. in rigid relation thereto.

The object of the invention is to provide a clamping bracket of this type which is of simple and inexpensive construction, readily attachable to objects of different sizes and capable of clamping conduits, cables, etc. which may run in various directions with reference to the fixed object. The novel bracket or clamp consists of a few parts, may be readily secured in position and with minor changes can be used for a wide variety of purposes.

This bracket includes a base member adapted to be placed against one surface of the object, a clamping member or jaw with two bearing ends, one of which engages the opposite surface of the object and the other one face of the base member, and means such as a bolt for forcing the clamping jaw tightly against the object and the base member. Attached to the base member in any convenient manner as by means of the same bolt, is a clamping jaw or holder between which and the base member is held the conduit to be supported.

For a better understanding of the invention, reference may be had to the accompanying drawing in which the device of the invention is shown in numerous forms and used for various purposes. In this drawing, Fig. 1 is a sectional view through a part of a beam, showing the device attached thereto and supporting a single conduit extending parallel to the long axis of the beam;

Fig. 2 is a bottom plan view of the structure shown in Fig. 1;

Fig. 3 is a side elevation of the structure shown in Fig. 1;

Fig. 4 is a view similar to Fig. 1 but showing the conduit extending at right angles to the long axis of the beam;

Fig. 5 is a view similar to Fig. 1 showing the device supporting a pair of conduits;

Figs. 6 and 7 are side and bottom plan views respectively of a structure similar to Fig. 1, in which the conduit is supported transversely to the long axis of the beam;

Fig. 8 shows a transverse sectional view through a beam with a pair of supporting clamps used to support a row of conduits;

Figs. 9 and 10 are sectional views through a beam showing the device supporting one and two cables, respectively;

Fig. 11 is a view similar to Fig. 1 showing the device supporting a conductor mounted on an insulator attached to the device, and Fig. 12 is a bottom plan view of the device shown in Fig. 11.

Referring now to the drawings, the clamping supporting device is shown in Fig. 1 attached to the flange of a beam 10. The device consists of a base member or disc 12 preferably in the form of a round metal plate of suitable diameter having an opening through its center. This plate is adapted to bear against the under surface of the beam 10. Extending through the opening in the disc is a bolt 13 having a head 14 at its upper end. This bolt passes through an opening in a clamping jaw 15 which has a short leg 16 and a long leg 17. The clamping member is generally arch shaped in cross-section, the opening through it lying at the apex of the arch and being somewhat larger than the bolt so that the member may have a slight freedom of movement relative to the bolt when the device is being secured in position.

The clamping member takes the form of a flat web 18 with an upstanding flange 19 projecting from each edge and preferably these flanges are spaced apart so that the head of the bolt may lie between them and the bolt is then held against turning by engagement of the sides of its head with the inner faces of the flanges. The distance between the tip of the short leg of the clamping member and the center of the bolt when the latter is in place is less than the radius of the base member 12 and this is also true with respect to the long leg 17. In mounting the device in place the short leg is placed against the upper surface of the flange of the beam and the long leg against the upper surface of the base member 12. A nut 20 on the bolt below the base member is then screwed up to tighten the bolt, the flange of the beam being clamped between the end of the short leg 16 and the upper surface of the base member while the long leg 17 of the clamping jaw bears against the upper surface of the base member and prevents it from turning around the edge of the flange to release the device therefrom.

By reason of the fact that the clamp jaw has legs of different lengths and is somewhat loosely mounted on the bolt, the device may be tightly secured on flanges of different thicknesses. When the device is secured to a flange thicker than that illustrated in Fig. 1, the clamping jaw is tilted on the bolt so that the long leg 17 has a more nearly upright position and the lower end of the leg 17 will then bear on the upper surface of the base member near the center. If the flange is thinner than that shown, the clamping jaw will assume another position of adjustment, but since the long leg is shorter than the radius of the plate 12, the end of the long leg will always bear against the upper surface of the base regardless of the thickness of the flange. This engagement of the long leg with the base plate insures that the upper surface of the plate will lie flat with the under surface of the flange and accordingly no matter how tightly the bolt is drawn up, there will be no tendency for the plate to tilt around the edge of the flange and release the device.

Means are provided for securing conduits, cables and the like to the device and for this purpose the bolt 13 may be conveniently used. For a single conduit there may be employed a clamping member 21 in the form of a metal strap having a curved portion 22 providing a seat for the conduit and an upright portion 22 which is adapted to bear against the under surface of the base plate. A nut 24 threaded on the bolt secures this clamping member in position. The member 21 is mounted loosely on the bolt and to secure a conduit to the flange, the device is first attached to the flange, then the member 21 is slipped over the end of the bolt and the conduit placed in proper position in its seat. The nut 24 is then threaded on the bolt to force the clamping member toward the under surface of the base plate. This causes the upper surface of the conduit 25 in the seat to bear against the bottom of the base plate and the upright portion 23 is also forced against the plate by reason of the loose fit of the member 23 on the bolt.

In Figs. 1, 2 and 3, the device is shown in position with the conduit extending parallel to the edge of the flange. Inasmuch as the clamping member 21 is loosely mounted on the bolt, it will be apparent that the conduit need not extend parallel to the beam but may extend transversely of the beam as illustrated in Fig. 4. Any other angular relation between the conduit and the beam may be employed as desired.

In Fig. 5, the device is illustrated in a form suitable for supporting two conduits. For this purpose, there is used a clamping member 26 having a pair of seats 27, one on each end, each similar to the seat portion 22. This double clamping member is held in position by the nut 24 as before, and it may be adjusted so as to hold the conduits in any desired position in a plane parallel to the plane of flange.

In the forms of the device so far described, the conduits extend in a plane parallel to the plane of the flange. In some instances, however, it may be desired to employ the device to hold a conduit extending transverse to the plane of the flange. For this purpose, a clamping member 28 may be used. This member takes the form of a flat strap of metal provided with a hooked end 29, defining a seat in which the conduit 25 may lie. This member is mounted on the end of the bolt 13 and held in place by a nut 20 as before, the conduit lying in the seat and resting with its surface in engagement with the edge of the flange. The conduit thus extends parallel to the bolt 13. This construction may be employed where the conduit extends vertically and is to be attached to a horizontal beam, or it may be employed where a horizontal conduit is to be attached to a column. For the latter purpose, the clamping member 28 may extend either above or below the bolt as may be desired.

In the construction illustrated in Fig. 8, a pair of clamp devices are employed for supporting a plurality of conduits 25. For this purpose, a device is attached to each flange of a beam in the usual manner and a strap member 30 of angle iron or the like is then mounted across the bolts 13 to provide a support for the row of conduits.

When the device is to be used for supporting a cable (Figs. 9 and 10) there is mounted on the lower end of the bolt a U-shaped member 31 having straight ends 32 drilled for bolts 33. Insulator plates 34 having central depressions providing an opening for the cable 35 are then secured to the ends of the member 31 in the manner illustrated with the conductor cable supported between them in the usual manner. A somewhat similar construction is illustrated in Fig. 10 except that the insulator members 34 are formed to support a pair of cables 35.

If it is desired to use the clamp device for supporting an insulator to which a wire may be attached, the base plate 12 may be drilled with a plurality of holes 36 in its periphery and after the device is secured to the flange, an insulator 37 of the common type may be mounted on a bolt 38 inserted through any one of the holes in the projecting portion of the plate. A wire 39 may be attached to this insulator in the usual manner.

It will be seen that in the new clamping device, the clamp jaw 15 accommodates itself readily to flanges of different thicknesses and as the bolt is drawn tight, the clamping action is increased, and there is no tendency for the base plate to tilt on the bolt so that the clamping effect is lost. This is because the clamp jaw is provided with a long leg which bears against the upper surface of the plate under all conditions of use and holds this plate parallel to and in engagement with the under surface of the flange. The clamping member for the conduit may take various forms and be secured to the remainder of the device in various ways, but for simplicity and convenience it is preferable to use a bolt 13 sufficiently long so that this clamping member may be mounted thereon in the manner described. The new device can be used to support conduits lying in a plane parallel to the plane of the beam flange and extending in any direction in that plane or it can be used to support a conduit extending transversely to the plane of the flange. Similarly, the device may be used for supporting conductors and for numerous other purposes which will be readily apparent.

We claim:—

1. A clamping device comprising the combination of a base plate, a jaw adapted to bear at one end against the base plate and at the other against the surface of an object to be gripped between said end and the base plate, said jaw in normal position extending around the edge of the object, a bolt passing through the base plate and jaw for holding said parts in operative relation, and clip means mounted on said bolt for clamping an element to said base plate.

2. A clamping device comprising the combination of a base member, a jaw adapted to bear at one end against the base member and at the other against the surface of an object to be gripped between said end and the base member, said jaw in normal position extending around the edge of the object, a bolt passing through the base member and jaw for holding said parts in operative relation, and a seat member mounted on said bolt for supporting an object.

3. A clamping device comprising the combination of a base plate, a pair of clamping jaws disposed one on each side of said base plate, one jaw having a portion adapted to bear against an object to be attached to the base plate and another portion adapted to bear against the base plate, the other jaw having a portion adapted to bear against a support to which the clamp is to be attached and another portion adapted to bear against said base plate, and means for securing the base plate and said jaws together.

4. A clamping device comprising the combination of a base plate, a jaw adapted to bear at one end against the base plate and at the other against the surface of an object to be gripped between said end and the base plate, said jaw in normal position extending around the edge of the object, means for holding the jaw and base plate in operative relation, and additional means engaging said holding means and cooperating therewith for clamping an object to said base plate.

5. A clamping device comprising the combination of a base plate, a clamping jaw adapted to bear at one end against the base plate and at the other end against the surface of an object to be gripped between said end and said base plate, said jaw in normal position extending around the edge of the object, a bolt for holding said jaw and base plate in operative relation and means engaging and supported by said bolt for holding an object to be supported.

In testimony whereof we affix our signatures.

WALTER S. MAYER.
WILLIAM T. BRADLEY.